United States Patent

[11] 3,571,804

[72] Inventors Goran Anders Henrik Hemdal
Tyreso;
Ferenc Belina, Trangsund, Sweden

[21] Appl. No. 747,375
[22] Filed July 24, 1968
[45] Patented Mar. 23, 1971
[73] Assignee Telefonaktiebolaget LM Ericsson
Stockholm, Sweden
[32] Priority Aug. 31, 1967
[33] Sweden
[31] 12071/67

[54] METHOD FOR EXECUTION OF JUMPS IN AN INSTRUCTION MEMORY OF A COMPUTER
3 Claims, 2 Drawing Figs.

[52] U.S. Cl. .......... 340/172.5
[51] Int. Cl. .......... G08f 9/18
[50] Field of Search .......... 340/172.5; 235/157; 340/172.5

[56] References Cited

UNITED STATES PATENTS

| | | | |
|---|---|---|---|
| 3,290,658 | 12/1966 | Callahan et al. | 340/172.5 |
| 3,292,155 | 12/1966 | Nielson | 340/172.5 |
| 3,348,211 | 10/1967 | Ghiron | 340/172.5 |
| 3,351,909 | 11/1967 | Hummel | 340/172.5 |
| 3,408,630 | 10/1968 | Packard et al. | 340/172.5 |
| 3,480,917 | 11/1969 | Day | 340/172.5 |
| 3,490,005 | 1/1970 | Anderson | 340/172.5 |

*Primary Examiner*—Paul J. Henon
*Assistant Examiner*—R. F. Chapuran
*Attorney*—Baxley and Hane

ABSTRACT: A computer system performs a jump instruction routine in a program of sequentially available addressed instructions. A jump instruction which includes an operator part and a variable part is stored in at a given address. When the jump instruction is performed the variable part is used to modify the present address of the jump instruction to establish a return address and also another address to indicate where a subroutine is stored.

INVENTORS
Göran Anders Henrik Hemdal
Ferenc Belina
BY Hane and Baxley
ATTORNEYS

INVENTORS
Göran Anders Henrik Hemdal
Ferenc Belina
BY Hane and Baxley
ATTORNEYS

METHOD FOR EXECUTION OF JUMPS IN AN INSTRUCTION MEMORY OF A COMPUTER

The present invention relates to a method for the execution of jumps to one instruction sequence of a group of instruction sequences in an instruction memory of a computer under the control of a jump instruction consisting of an operator and a variable part comprising several variables.

The operations carried out in a computer and the order in which they occur are stated by means of a sequence of instructions, i.e., a program, stored in an instruction memory. To be able to carry out jumps in the program e.g. to carry out an often repeated instruction or instruction sequence which is stored at an arbitrary place in the instruction memory, the program includes a jump instruction which consists of a modifier and a variable part by means of which the modifier states a jump to a memory address indicated by the variable part wherein, in which the first instruction of the wanted instruction sequence is stored. The last instruction of the sequence then causes a jump backward to the instruction which follows the jump instruction in the program. The disadvantage with this method is, on one hand, that a fixed jump instruction always addresses the same instruction sequence and, on the other hand, if a fixed sequence is to be passed through a great number of times the same number of jump instructions must be stored in the program.

An object of the present invention is to provide a method and apparatus for performing jump instructions which is more versatile and does not have the disadvantages of heretofore known methods of performing such instructions.

Briefly, the invention contemplates a jump instruction routine in a program which includes a series of sequentially available addressed instructions. A jump instruction is stored at an address $n$. The instruction includes an operator part and two variable parts D and $Rx$. When the jump instruction is performed the address $n$—D is formed and stored in a preassigned register. Then the contents $a$ of another preassigned register indicated by $Rx$ is added to the value $n$ to form an address $n+a$ which is the address of a register where the starting address of a subroutine is stored. The program then performs the subroutine and the last instruction thereof causes the program to go to the first preassigned register to get the address of the next instruction.

Figure 1:
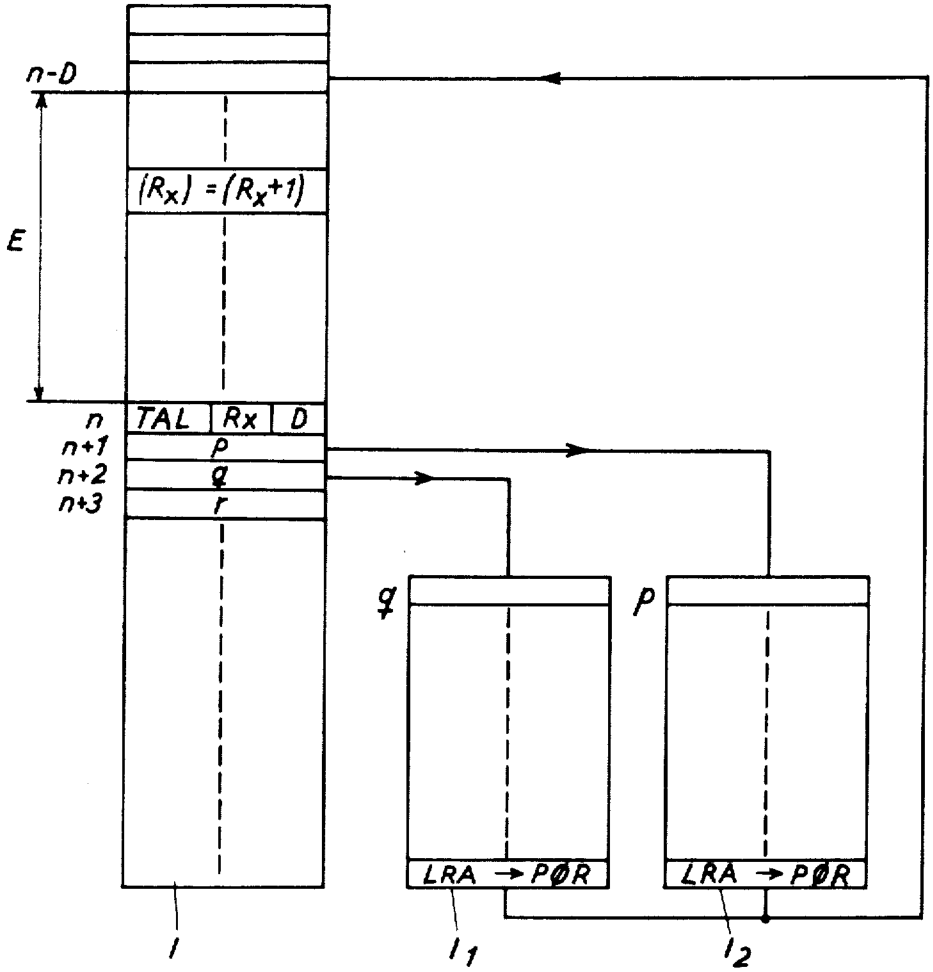
Figure 2:
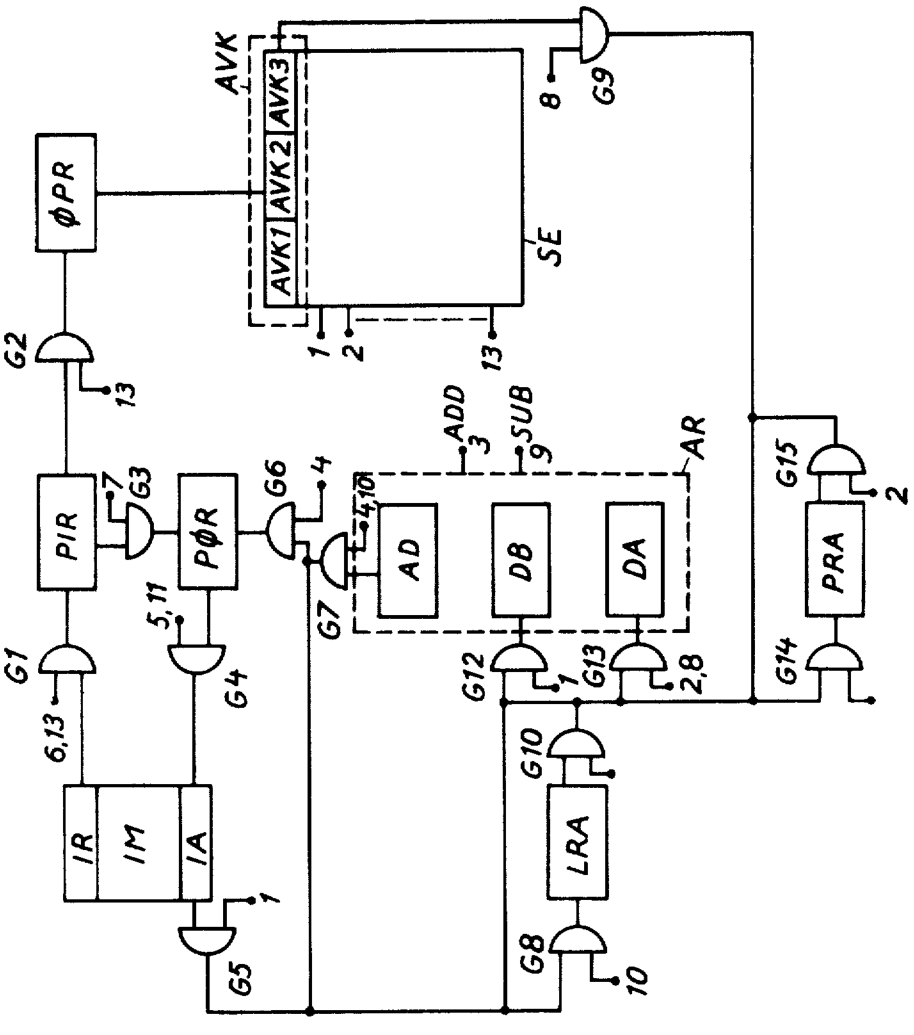

The invention will be described in greater detail with reference to the accompanying drawing in which FIG. 1 is a diagram, which describes the principle of the invention and FIG. 2 shows an example of logic apparatus for carrying out the method according to the invention.

In FIG. 1 an instruction sequence which forms the main program in a computer is indicated by I. It is desired to be able to perform jumps from this program to one of a number of subprograms (subroutines) of which two, indicated $I_1$ and $I_2$, are shown in the FIG. In FIG. 1 the rectangular fields in the program indicate instructions. The contents of an instruction is indicated in the respective fields and the address of the instruction is stated to the left of the respective field. The instruction which determines the jump to the subprogram is found at address $n$. This instruction consists of an operator (operation code) indicated by TAL and of a variable part containing two variables $R_x$ and D. When this instruction is reached during the sequencing of the main program, the operator controls the following operations by the variables. First the variable, indicated D, is subtracted from the number $n$ which indicates the present instruction address and the result obtained $n$—D, which forms an address, appearing previously in the main program, is stored. A register is thereafter addressed in the central unit of the computer by the aid of the variable $R_x$ the contents of which for example can be 1, as will be described below. The contents of this register 1 is thereafter added to the instruction address $n$ by means of which the address $n+1$ is obtained and this address is indicated in the program. The address to the first instruction $p$ in the subprogram $I_2$, is stored in this address so that a jump to this address is made and the central unit starts to operate according to the instructions in this subprogram. On the last address of the subprogram an instruction is stored, which indicates the register in which the subtracted result $n$—D, is stored and addresses the instruction at this address. In this way we return to the main program at the position $n$—D and return to the jump instruction at the address $n$, after having passed through the portion indicated by E of the program. This part of the program can be used to modify the contents in that register which is addressed by the variable $R_x$ in the jump instruction, independent of or depending on the result in the last subprogram passed through. The sequence E can e.g. contain an instruction which increases the contents in the register by 1, every time the sequence passes through as it appears from FIG. 1, whereby the addresses $n+1$, $n+2$, $n+3$ etc. will be indicated in turn by the jump instruction on the address $n$. Thus it is possible to jump a desired number of times by means of one single jump instruction to one of a number of subprograms, and the number of subprograms can, in principle, be unlimited.

In FIG. 2 there is shown the elements required in a central processing unit for the execution of the jump instruction. An instruction memory is indicated by IM in which the instructions controlling the operations of the computer are stored. An address register IA and a result register IR are associated with this memory. The memory operates in such a way that when an address is written into the address register the instruction located in the result register is obtained. It is assumed that the stored jump instruction in the address $n$ in FIG. 1 is obtained in this way from the register IR and transferred, via an AND gate G1, a program input register PIR and an AND gate G2, to an operating register OPR, which is connected to a decoder AVK associated with a control unit SE. This decoder consists of three parts AVK1, AVK2 and AVK3 of which AVK1 comprises the operator (TAL) of the instruction, AVK2 the register address $R_x$ and AVK3 the variable D. The decoder activates a number of inputs of the control unit SE which, in a conventional way, consists of a logical network and a shift register which is stepped forward by a pulse generator and emits sequentially output impulses on a number of outlets indicated 1, 2.....13. These outlets are connected to inlets of AND gates G1—G15 provided with the corresponding numbers in the central unit. The pulse at the outlet No. 1 in the control unit SE will thus open the gates G5 and G12, so that the contents of the address register IA, which constitutes the address of the jump instruction ($n$ in FIG. 1), is transferred to an operand register DB of an arithmetic unit are Then pulse No. 2 opens the gates G13 and G15, so that the contents of a register PRA which contains the number which is to be added to the instruction address is transferred to a second operand register DA of the arithmetic unit. The addressing of the register PRA is thereby determined by the variable $R_x$ and the addition is carried out during pulse No. 3, which activates an addition inlet ADD of the arithmetic unit and the sum obtained is transferred during the pulses 4 and 5 via the gates G7 and G6, first, to a program output register POR and, then, via the gate G4 to the address register IA, so that the located instruction obtained from the sum address is read to the result register IR. This instruction which is formed of the address of the first instruction in a subprogram (e.g. $p$ in FIG. 1) is then transferred during the pulses 6 and 7, via the gate G1, a program input register PIR and the gate G3, to a program output register POR. During pulse 8 the number D in the variable part of the jump instruction which is to be subtracted from the instruction address $n$ is transferred from the decoder to the operand register DA via the gates G9 and G13. In the second operand register the instruction address $n$ remains and the subtraction is carried out at pulse 9 which activates a subtraction inlet SUB of the arithmetic unit. The result $n$—D obtained in the register AD is then transferred during pulse 10 to a register LRA via the gates G7 and G8. Thereafter, the last three pulses 11, 12, and 13 transfer the contents in the register POR to the instruction address register IA and feed the instruction $p$ existing at the address from the result register IR via the program register PIR to the order register OPR, so that the operations in the chosen subprogram is started. As shown in FIG. 1 every subprogram is terminated with an instruction which transfers the contents in the register LRA to the program output register POR, from where it is further fed to the address register IA. Thus after the execution of a subprogram one always returns to an address $n$—D located ahead of the jump instruction and then passes through the sequence E, during which sequence the contents of the register PRA can be modified so that the succeeding jump takes place to the desired instruction sequence. It is of course also possible to execute this modification in the subprogram.

The method according to the invention thus implies that jumps can be easily controlled by a jump instruction to one of an arbitrary number of subprograms and the choice of subprogram can be made dependent upon which subprograms have been previously executed with using the data memory of the computer.

We claim:

1. In a digital computer which includes storage means for storing a main program sequence of addressed instructions and at least a subroutine of addressed instructions, arithmetic means, an addressed return-address register, at least one addressed subroutine-address register for storing the starting address of the subroutine, an addressed constant register storing a constant and control means for sequencing the digital computer through series of instructions, the method of performing a jump routine from a first particular instruction of the main program sequence of instructions to the subroutine of instructions and of returning to a second particular instruction of the main program sequence of instructions upon completion of the subroutine of instructions, said method comprising the steps of storing as a part of said first particular instruction the address of the addressed constant register and a given number, storing as a part of the last instruction in the subroutine of instructions the address of the return-address register, initiating the digital computer to start performing the main sequence of instructions, at the occurrence of said first particular instruction fetching the contents of the addressed constant register indicated by the address stored as a part of said first particular instruction, adding the contents of the addressed constant register to the address of said first particular instruction to form the address of the subroutine-address register and subtracting said given number from the address of said first particular instruction to form the address of said second particular instruction of the main program sequence of instructions, storing the so formed address of said second particular instruction in said return-address register, utilizing the address formed by the sum of said first given number and the address of said first particular instruction to access the addressed subroutine-address register, locating the first instruction of the subroutine by means of the address stored in the addressed subroutine-address register, sequencing through the instructions of the subroutine to the last instruction, fetching the return-address stored in the return-address register whose address is included in the last instruction of the subroutine, and directing the control means to return to the second particular instruction of the main program sequence of instructions which is indicated by the address fetched from the return-address register.

2. The method of claim 1 wherein said storage means of said digital computer stores a plurality of subroutines of addressed instructions and said digital computer includes a plurality of addressed subroutine-address registers each storing the starting address of one of the subroutines, said method further comprising the step of modifying the constant stored in the addressed constant register during the performance of the main sequence of instructions.

3. Apparatus for performing a jump routine from a first particular instruction of a main program sequence of instructions to a subroutine of instructions and for returning to a second particular instruction of the main program sequence of instructions upon completion of the subroutine of instructions comprising an addressed storage means for storing the instructions of the main sequence of instructions in sequentially addressed registers and for storing the instructions of the subroutine of instructions in other sequentially addressed registers, a return-address register, an addressed subroutine-address register for storing the starting address of the subroutine of instructions, an addressed constant register for storing a constant, a first particular register of said addressed registers that store the main program sequence of instructions storing as a part of the first particular instruction the address of said addressed constant register and a given number, the last addressed register of the sequence of said addressed registers that store the subroutine of instructions storing the address of said return-address register, means for indicating the address of each instruction being performed, means operating in response to the first particular instruction for fetching the contents of said addressed constant register, arithmetic means for adding the contents of said addressed constant register to the address of the first particular instruction to form the address of said subroutine-address register and for subtracting said given number stored in said first particular register by the address of the first particular instruction to form the address of the register which stores the second particular instruction of the main program sequence of instructions, means for transferring the so formed address to said return-address register, means responsive to the address formed by the sum of said given number and the address of said first particular register storing the first particular instruction to access the contents of said addressed subroutine-address register, means for obtaining the first instruction of the subroutine of instructions by utilizing the contents of said addressed subroutine-address register, means responsive to the contents of the register storing the last instruction of the subroutine of instructions to access said return-address register, and means responsive to the contents of said return-address register to access the register storing the second particular instruction of the main program sequence of instructions.